United States Patent [19]
Kirk

[11] 3,945,918
[45] Mar. 23, 1976

[54] METHODS AND APPARATUS FOR TREATING A LIQUID WITH A GAS

[75] Inventor: Bradley S. Kirk, Warren, N.J.

[73] Assignee: Airco, Inc., Montvale, N.J.

[22] Filed: Jan. 10, 1974

[21] Appl. No.: 433,015

[52] U.S. Cl................ 210/44; 210/63 Z; 210/195 S; 210/255; 261/21; 261/125
[51] Int. Cl.²............................................ C02C 1/38
[58] Field of Search........................... 210/13–15, 210/60, 61, 63, 195, 199, 218, 255, 258, 262, 44, 192, 8; 261/21, 125

[56] References Cited
UNITED STATES PATENTS

| | | | |
|---|---|---|---|
| 3,054,602 | 9/1962 | Proudman | 261/21 |
| 3,443,694 | 5/1969 | Malinovsky | 210/255 X |
| 3,547,815 | 12/1970 | McWhirter | 210/15 X |
| 3,660,277 | 5/1972 | McWhirter et al. | 210/15 X |
| 3,733,264 | 5/1973 | Spector et al. | 210/15 X |
| 3,772,188 | 11/1973 | Edwards | 210/15 |
| 3,826,742 | 7/1974 | Kirk et al. | 210/63 |
| 3,892,659 | 7/1975 | Kirk | 210/3 |

FOREIGN PATENTS OR APPLICATIONS

| | | | |
|---|---|---|---|
| 547,608 | 3/1932 | Germany | 210/255 |

*Primary Examiner*—Thomas G. Wyse
*Attorney, Agent, or Firm*—David L. Rae; H. Hume Mathews; Edmund W. Bopp

[57] ABSTRACT

Methods and apparatus for treating a liquid with a gas wherein a liquid feed is introduced to the initial stage of a multi-stage device for dissolving the gas in the liquid. Efficient mass transfer is achieved by effecting a gas-liquid counter flow in serial stages of the dissolution device. The effluent from the dissolution device exhibits a relatively high dissolved gas concentration which gas is subsequently consumed by the liquid in a reaction tank. A liquid recycle line is provided for returning and combining treated liquid with the incoming feed thereby enabling further dissolution of the gas in the liquid. In the course of treating wastewater with ozone, a flotation clarifier may be provided with the initial stage of the dissolution device to enable the surface coagulation of impurities in the wastewater feed. The coagulants may be skimmed prior to introducing wastewater into subsequent stages of the dissolution device, thereby substantially reducing the ultimate ozone demand of the wastewater.

20 Claims, 3 Drawing Figures

METHODS AND APPARATUS FOR TREATING A LIQUID WITH A GAS

BACKGROUND OF THE INVENTION

The present invention relates to methods and apparatus for treating a liquid with a gas, and more particularly, to methods and apparatus for efficiently treating wastewater with ozone.

In numerous applications it is necessary to treat a liquid with a gas in order to dissolve the gas in the liquid. Frequently, the liquid will exhibit a demand for a particular gas and by meeting such a demand, certain desired results may be achieved. For example, it is well known to disinfect water by dissolving ozone or chlorine therein for the purpose of providing potable water. Alternatively, it is practical to treat wastewater with ozone in order to aid in reducing the chemical oxygen demand (COD) of the wastewater in a purification process. Realization of the foregoing desired purposes, however, is subject to the implied prerequisite that such processes be conducted economically. Hence, ozone dissolution must be efficient, both in terms of the mechanical energy required and the utilization of supplied ozone.

In order to effectively treat wastewater with ozone, a substantial degree of contacting between ozone gas and wastewater must occur to cause the necessary chemical reaction therebetween. Maintenance of high concentrations of dissolved ozone is also required to effect desirable COD reductions. Previously, plural independent gas-liquid mixing devices have been utilized to obtain required levels of dissolved ozone notwithstanding complexities in controlling such devices in response to varying demands (COD) and flow rates of wastewater for ozone. In addition, as the space available for waste treatment apparatus as aforesaid is generally extremely limited, physically compact treatment systems are preferred. Similarly, the capital cost of such equipment must also be maintained within prescribed limits in order to avoid prohibitively expensive waste treatment systems.

In processes for treating wastewater with ozone, an ozone generator is commonly provided as a source of an ozone enriched feed gas. Overall ozone costs may be reduced by recycling an ozonating gas which has not been consumed by wastewater to the ozone generator. This is particularly true in applications wherein oxygen is utilized as a carrier gas for ozone. As maximum ozone generation efficiencies are obtainable when oxygen is supplied as the primary starting material, recycling of the oxygen carrier gas is required in view of the cost of producing oxygen. In other applications wherein air is utilized as a carrier gas, recompression and drying of the ozonating gas substantially destroys ozone therein. Generally, this ozonating gas is vented to the atmosphere subsequent to ozone destruction. However, notwithstanding the recycling of an oxygen carrier gas, previous ozone dissolution techniques have required independent control of each of a plurality of gas-liquid mixing devices, which controls are complex and expensive, in order to provide economical treatment processes. Thus, previous ozonation processes have not been efficient in matching the ozone demand of wastewater with the amount of ozone actually supplied to a dissolution device.

OBJECTS OF THE INVENTION

It is an object of the present invention to provide methods and apparatus for efficiently dissolving a gas in a liquid.

It is a further object of the present invention to provide methods and apparatus for dissolving ozone in wastewater with a minimal expenditure of mechanical energy.

It is still another object of the present invention to maximize the utilization of ozone supplied in the course of treating wastewater therewith.

Yet another object of the present invention is to provide methods and apparatus for matching the demand of a liquid for a gas with the amount of gas supplied thereto.

It is still a further object of the present invention to provide methods and apparatus for efficiently dissolving ozone in wastewater notwithstanding substantial variations of influent wastewater flow rates and waste concentrations.

It is another object of the present invention to provide methods and apparatus for enabling the treatment of wastewater with ozone in equipment of reduced capital costs.

It is yet another object of the present invention to increase the efficiency of methods and apparatus for treating wastewater with ozone by effecting flotation clarification at the inlet of a dissolution device.

It is another object of the present invention to provide methods and apparatus for ozonating wastewater wherein capital costs of equipment are reduced by recycling wastewater from a reaction vessel to a dissolution device in accordance with the ozone demand of influent wastewater.

It is an additional object of the present invention to provide methods and apparatus for ozonating wastewater wherein the control of gas-liquid mixing devices, in response to varying ozone demands and flow rates of wastewater, is substantially simplified.

Other objects of the present invention will become apparent from the detailed description of an exemplary embodiment thereof which follows and the novel features of the present invention will be particularly pointed out in conjunction with the claims appended hereto.

SUMMARY

In accordance with the present invention, a method of treating a liquid exhibiting a demand for a gas by dissolution of the gas therein comprises the steps of: introducing said liquid into the initial stage of a multistage dissolution device; introducing a gas into the last stage of said device and establishing a liquid-gas counterflow thereby dissolving said gas in said liquid; passing effluent of the dissolution device to a reaction tank wherein dissolved gas is consumed by said liquid; recycling at least a portion of the liquid in said reaction tank to the initial stage of said dissolution device to enable further dissolution of said gas in said liquid; and discharging treated liquid from said reaction tank.

BRIEF DESCRIPTION OF THE DRAWING

The invention will be more clearly understood by reference to the following detailed description of an exemplary embodiment thereof in conjunction with the following drawing in which.

DESCRIPTION OF THE PREFERRED EMBODIMENTS

Figure 1:
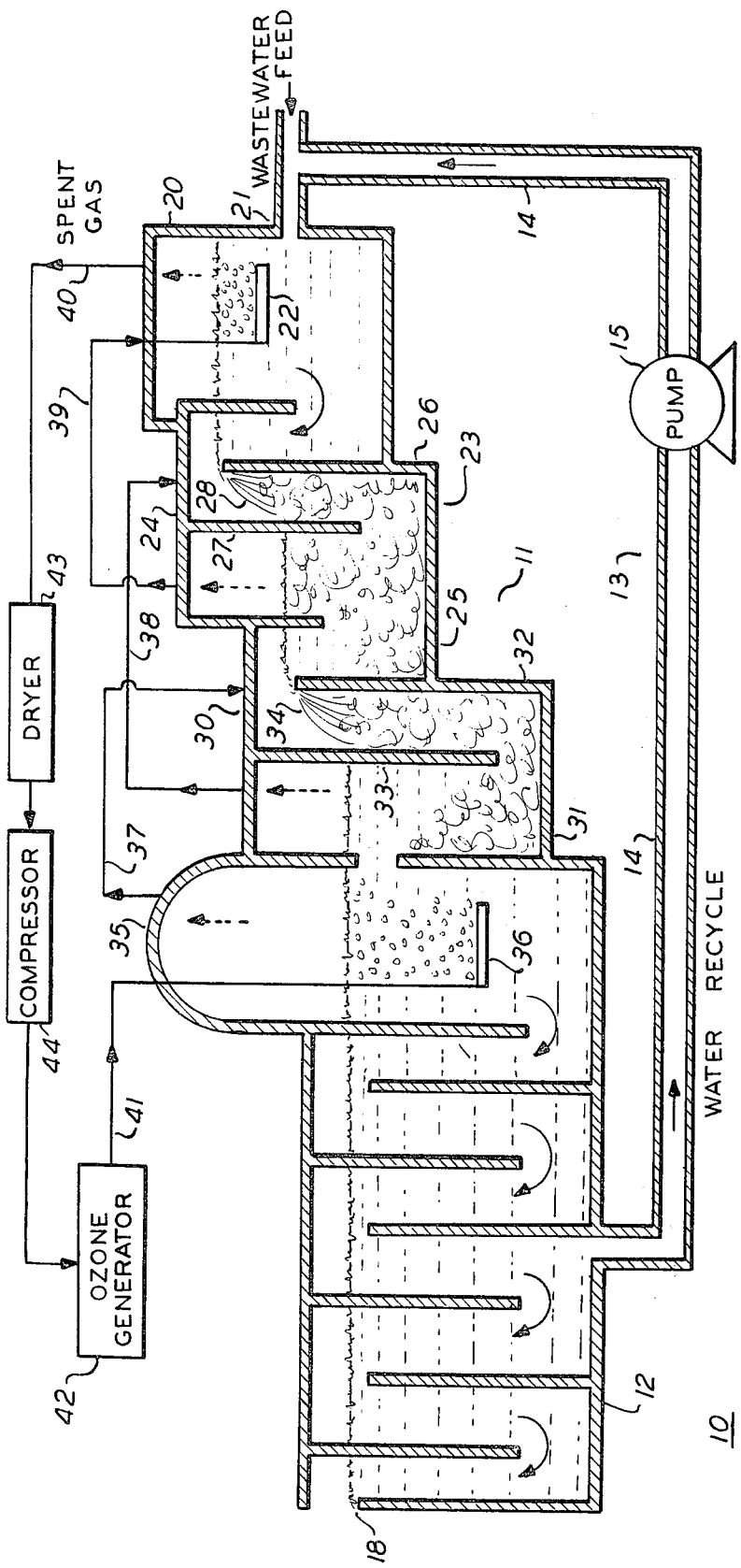
FIG. 1 is a partial sectional elevational view of an exemplary apparatus for the dissolution of a gas in a liquid.

Referring now to the drawing, and in particular to FIG. 1, illustrated therein is an exemplary embodiment of apparatus for treating a gas with a liquid. Apparatus 10 is preferably comprised of a multi-stage dissolution device 11, reaction tank 12 and a water recycle means 13. Dissolution device 11 preferably includes a plurality of gas-liquid mixing devices, each of which comprises a dissolution stage and one or more different types of mixing devices may be utilized. The first stage of dissolution device 11 is comprised of an enclosure 20, liquid inlet 21, mixing device 22 and gas inlet and outlet conduits 39 and 40. Inlet 21 is disposed at a suitable location in enclosure 20 for receiving a liquid such as a wastewater feed. Additionally, water recycled from reaction tank 12, the purpose of which will be described in detail hereafter, is combined with the wastewater feed prior to the admittance thereof through inlet 21 of enclosure 20. A mixing device 22, which may take the form of a conventional sparger ring is preferably suitably disposed below the level of inlet 21 and beneath the surface of liquid within enclosure 20. However, mixing device 22 may be located slightly above inlet 21 as shown in FIG. 1. Mixing device 22 is effective in known manner to release a multitude of small, fine bubbles of gas supplied thereto through gas inlet 39. As such gas bubbles rise through the liquid within enclosure 20, a mass transfer of gas into the liquid is effected. The gas, which preferably comprises ozone, is either dissolved in the liquid, such as wastewater, or is disentrained therefrom into the ullage space above the liquid within enclosure 20 and is subsequently exited through gas outlet 40 as spent gas. In utilizing an air carrier, the spent gas may be dried to destroy ozone and vented to the atmosphere, although in using an oxygen carrier, it is preferable to return this gas through a conventional drier 43 and compressor 44 to an ozone generator means 42 thereby recovering a substantial portion of the oxygen present in the spent gas.

The effluent from the first stage of dissolution device 11 is passed to the second stage thereof which preferably comprises the static, gas-liquid mixing device of the gravitational fall type. A detailed description of the gravitational fall type mixing device is provided in U.S. Pat. No. 3,826,742 which is assigned to the assignee of the present invention. The second stage of device 11 is comprised of a top enclosure portion 24, a bottom portion 25, a substantially vertical side portion 26 and a baffle 27 depending substantially vertically from top portion 24. A mixing zone 28 is thereby defined between side portion 26 and baffle 27. A gas inlet 38 is disposed to communicate with mixing zone 28 and to supply a gas, such as an ozone enriched gas thereto. A gas outlet line 39 is disposed to receive disentrained gas from liquid within the second stage of dissolution device 11 and to return this gas to mixing device 22.

The effluent of the aforementioned second stage of dissolution device 11 is passed to a third stage which may take the form of a further gravitational fall type static mixing device. The third stage of device 11 is generally formed as an enclosure having a top portion 30, bottom portion 31, side portion 32 and a vertically disposed baffle 33 depending from top portion 30. A gravitational fall zone 34 is defined between side portion 32 and baffle 33. A gas inlet line 37 is disposed to supply a gas to fall zone 34 and a gas outlet line 38 is arranged in communication with the gas space above liquid retained in the third stage of device 11. Outlet line 38 is effective to supply gas disentrained from this liquid to gravitational fall zone 28 of the mixing device forming the second stage of dissolution device 11 as previously mentioned.

The fourth stage of dissolution device 11 is generally comprised of a chamber 35 adapted to receive the third stage effluent. A mixing device 36, which may comprise a conventional sparger, is suitably disposed within chamber 35 and is connected to a gas supply by way of inlet line 41. Such a gas supply may form an ozone enriched feed gas received from ozone generator 42. A gas outlet line 37 is disposed in communication with the gas space above liquid within chamber 35 and is effective to collect gas disentrained from the liquid within chamber 35 and to supply this gas to the gravitational fall zone 34 of the third stage of dissolution device 11.

A reaction tank 12 is disposed to receive the effluent from the fourth stage of dissolution device 11. Furthermore, reaction tank 12 is provided with a plurality of vertically disposed interior baffles which are positioned to define a plurality of stages. By causing liquid entering reaction tank 12 to flow sequentially through a plurality of stages therein, the length of time during which liquid is retained in tank 12 may be readily determined in light of the time necessary for gas previously dissolved in the liquid to be consumed thereby. Reaction tank 12 is preferably covered to prevent the escape of any toxic gas, such as ozone, from the liquid flowing therethrough. A liquid, or water recycle line 14 is disposed in communication with one stage of reaction tank 12 and, for example, may be adapted to recycle liquid from one stage of the reaction tank 12 as illustrated in FIG. 1. The rate at which water is recycled to inlet 21 of the initial stage of dissolution device 11 is readily controlled by regulating the operation of pump 15. Finally, the treated effluent from the third stage of reaction tank 12 is passed therefrom for subsequent use in any convenient manner and, for example, may be caused to flow over a weir 18 formed as a portion of reaction tank 12.

The operation of apparatus 10 will now be described. Dissolution device 11 functions to dissolve a gas, such as ozone, in a liquid, such as wastewater, on the basis of a gas-liquid counterflow. Thus, wastewater is admitted to the initial stage of device 11 and sequentially flows therethrough to final stage while the gas to be dissolved therein is introduced into the final stage of device 11 and is caused to contact liquid in each stage thereof in reverse order. Accordingly, only a single gas source, such as an ozone generator 42, is required to supply gas to each of a plurality of mixing stages of dissolution device 11. Furthermore, the actual ozone content in the ozonating gas supplied to each stage decreases from the fourth stage to the first stage of device 11. By supplying such decreasing concentrations of ozone to each stage of device 11, a minimal amount of ozone is eventually collected in outlet line 40 and returned as spent gas to an ozone generator 42.

As illustrated in FIG. 1, the ozone feed through line 41 to mixing device 36, is emitted therefrom in the form of fine bubbles rising toward the surface of wastewater within chamber 35. As wastewater introduced into chamber 35 flows in a generally downwardly direction, frictional forces between bubbles of the ozonating gas and the liquid tend to increase the contact time between wastewater and the gas, thereby effecting a mass transfer of ozone into the wastewater. Similarly, other gases present in the wastewater are stripped therefrom and along with ozone enriched feed gas not dissolved in the wastewater are released into the vapor space within chamber 35. The disentrained gas is, however, still available for use as an "ozonating" gas and this gas is collected in line 37 and is supplied to the previous stage of dissolution device 11. Thus, the gas disentrained from wastewater within chamber 35 is supplied to the gravitational fall zone 34 of the third stage of dissolution device 11. As described in the aforementioned patent, a portion of the gas supplied to a fall zone is dissolved in the liquid flowing therethrough and the remainder is swept into a liquid accumulation space generally which may be considered as being defined by baffle 33 and the sidewall of chamber 35. The ozonating gas, along with other gases, is disentrained from the wastewater in this stage of device 11, is collected in outlet line 38 and is again available for use as an ozonating gas in another previous stage of dissolution device 11. It will be appreciated that as further amounts of ozone contained in the initial ozone enriched feed gas are dissolved in wastewater and as additional amounts of other gases are stripped from the wastewater, the actual ozone content of the ozonating gas decreases as the ozonating gas is supplied in a counterflow relation from one stage to another in dissolution device 11. It will be recognized that as the ozonating gas is supplied to each of four stages of the dissolution device sequentially, four separate opportunities for dissolution in wastewater are presented. Accordingly, only a relatively low amount of ozone is vented as spent gas through line 40.

Ozone contained in the ozonating gas supplied through line 38 to the gravitational fall zone 28 of the second stage of device 11 is both dissolved and entrained in wastewater flowing therethrough. Again, the portion of the ozonating gas disentrained from wastewater in the liquid accumulation space of this stage of device 11, and other gases stripped from this wastewater, are collected in line 39 and are supplied as an ozonating gas to mixing device 22 of the first stage of device 11. In a manner substantially identical to the operation of the fourth stage of device 11, ozone contained in the ozonating gas released by mixing device 22 is both dissolved in and disentrained from wastewater introduced through inlet 21. Accordingly, the disentrained ozonating gas and waste gases stripped from the wastewater in enclosure 20 are collected in outlet line 40 and are returned as spent gas to ozone generator 42.

It will be appreciated that by utilizing an ozone-wastewater counterflow and returning ozone disentrained from wastewater in each stage of dissolution device 11 to a previous stage thereof, several opportunities for redissolution of ozone are presented and efficient use of the ozone feed supplied from generator 42 through line 41 to mixing device 36 is attained.

The effluent from chamber 35 of dissolution device 11 is caused to flow essentially the through stages of reaction tank 12. During this flow, ozone dissolved in wastewater will be consumed in the course of, for example, reducing wastewater COD or, disinfecting wastewater to render the same potable. However, as the ozone demand of wastewater is many times considerably greater than the amount of ozone which can be dissolved in a unit volume of wastewater passing through device 11, a water recycle line 14 and pump 15 are provided to recycle water from reaction tank 12 to the inlet of the initial stage of dissolution device 11. The wastewater feed and recycled water may be mixed prior to the introduction of the mixed liquid into enclosure 20 or alternately, recycling water to mixing zone 28. It will be appreciated that the ratio of the recycled water wastewater feed will be controlled in accordance with the wastewater ozone demand. Thus, wastewater exhibiting a relatively high ozone demand or a high COD will require a greater recycle feed ratio, which for example, may approach 5:1. Alternatively, for wastewater to be disinfected, lower recycle feed ratios may be established. Preferably, the ozone enriched feed gas supplied by generator 42 to dissolution device 11 is controlled so as to maintain an ozone concentration of approximately 0.5 p.p.m. of dissolved ozone near the recycle take-off point in reaction tank 12. Accordingly, water recycled through line 14 to the inlet of device 11 is caused to exhibit a substantially constant ozone concentration such that variations in wastewater ozone demand can be met by merely adjusting the aforedescribed recycle ratio. Although ozone is generally known to withstand only limited compression pressures, the pressure of the ozone feed supplied through line 41 to mixing device 36 and the pressure of the ozonating gas supplied through line 39 to mixing device 22 must nontheless be sufficient to overcome the hydraulic back pressure of surrounding wastewater and the pressure losses of the particular mixing device (sparger) itself. Suitable compression, however, is generally available from compressor 44 and may be relied upon to provide sufficient pressures to enable operation of apparatus 10. Therefore, the mechanical energy (compression) costs of ozonating wastewater in accordance with the present invention are limited to economically acceptable values.

It will be realized that the gas counterflow through dissolution device 11 is accomplished by buoyant forces and the liquid flow therethrough is caused by gravity. Accordingly, no internal pumps are required in order to effect the operation of dissolution device 11.

Figure 2:
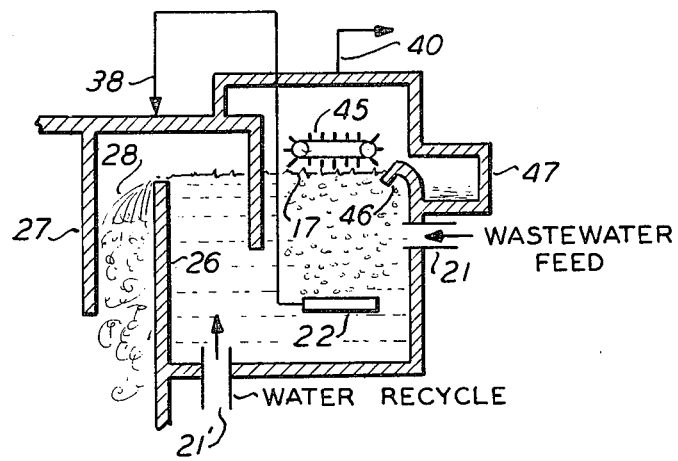
FIG. 2 is a partial sectional view of the dissolution device illustrated in FIG. 1 modified to enable flotation clarification of an influent liquid.

A further exemplary embodiment of the present invention is illustrated in FIG. 2. In this embodiment, the initial stage of dissolution device 11 is modified to permit flotation clarification of the influent wastewater feed. Structurally, the initial stage of device 11 is substantially similar to the corresponding stage illustrated in FIG. 1 and described heretofore. Accordingly, only the modifications thereto will be described below. Referring again to FIG. 2, enclosure 20 is provided with two liquid inlets in the form of wastewater feed 21 and water recycle inlet 21'. Inlet 21 is preferably provided on a sidewall of enclosure 20 at a level above the level of mixing device 22. The water recycle inlet 21' is preferably provided at a location in enclosure 20 remote from wastewater inlet 21. Thus, water recycle inlet 21' may be provided in the bottom wall of the enclosure 20 as illustrated in FIG. 2. In operation, wastewater introduced through inlet 21 into enclosure 20 is contacted by ozone supplied through mixing device 22 in close proximity to inlet 21 before substantial dilution or mixing of influent wastewater with the liquid contents of enclosure 20 is effected. Contact with the ozonating gas causes suspended solids and colloids present in the introduced wastewater feed to coagulate and rise to surface 17 of the liquid within enclosure 20. A froth is thus developed at surface 17 and by utilizing conventional skimming apparatus such as a paddle-type skimmer 45, weir 46 and receptacle 47, suspended solids in the froth may be readily removed. The foregoing flotation clarification of wastewater introduced into the initial stage of dissolution device 11, is effective to substantially reduce the waste material which would otherwise demand ozone in subsequent stages. In this manner, the ozone demand of wastewater is significantly diminished.

The water recycled through conduit 14 (FIG. 1) is preferably introduced through inlet 21' to a portion of enclosure 20 physically remote from inlet 21 and mixing device 22. It will be appreciated that as recycled water is devoid of a substantial portion of the suspended solids and colloids present in the wastewater feed, the necessity of contacting recycled water with an ozonating gas for the purposes of flotation clarification is no longer present. Hence, it is preferable to expose a substantially undiluted wastewater feed to the ozonating gas emitted through mixing device 22 and to introduce recycled water in such a manner as to avoid significant dilution of the wastewater feed prior to the aforementioned gas contact. Thus, recycled water may be introduced into enclosure 20 as illustrated in FIG. 2 with this water essentially supplied to the inlet of the second stage of dissolution device 11.

Figure 3:
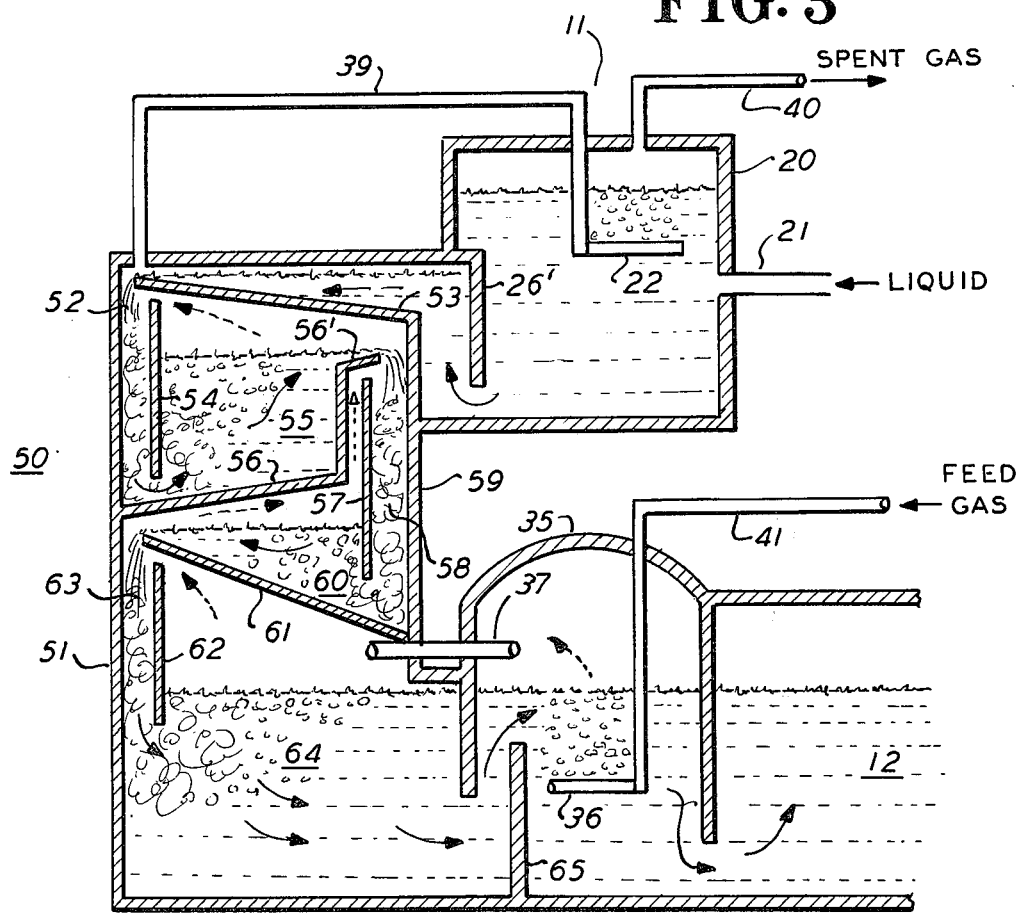
FIG. 3 is a partial sectional view of a further embodiment of a dissolution device utilized in the treatment of a liquid with a gas.

It will be appreciated that although dissolution device 11 has been described as comprised of mixing devices in the form of two sparging stages and two gravitational fall stages for dissolving an ozonating gas in wastewater, the present invention may encompass a dissolution device 11 comprised of other arrangements of individual gas dissolution stages. A further exemplary embodiment of dissolution device 11 utilizing a gas-liquid counterflow technique is illustrated in FIG. 3. In this exemplary form, dissolution device 11 is provided with a pair of sparging mixing devices and a novel configuration of three gravitational fall static mixing devices. As the structure and operation of sparging mixing devices provided with dissolution device 11 have been previously described, further description of such stages will be set forth only insofar as necessary to impart a clear understanding of the present invention and to describe the structure and operation of the novel gravitational fall static mixing device 50.

The gravitational fall static mixing device 50 illustrated in FIG. 3 is preferably comprised of a plurality of individual gravitational fall stages. It is recognized that although three of such stages are depicted in FIG. 3, the number of such stages may vary in accordance with the desired dissolution levels to be obtained thereby. Static mixing device 50 is comprised of a housing 51 and suitable partitions and baffle members for forming gravitational fall zones 52, 58 and 63. More particularly, a first partition 53 is provided in the upper reaches of housing 51 and is preferably inclined at a relatively small angle to the horizontal. Oriented substantially vertically and spaced away from one extremity of partition 53 is a baffle 54 which, in conjunction with a sidewall of housing 51, is effective to define gravitational fall zone 52. A further partition 56 which preferably extends from the sidewall of housing 51 in an angulated manner is effective to define the lower boundary of fall zone 52 and the bottom of liquid accumulation space 55. An upwardly extending portion of baffle 56 is also effective to confine liquid within space 55. Partition 56 is also provided with a lip portion 56' over which liquid within space 55 is permitted to flow as will be described in greater detail hereafter. By spacing the uppermost extremity of baffle 54 away from partition 53, an interconnection between the gas space formed above liquid space 55 and the upper reaches of fall zone 52 is established.

A baffle 57 is provided in a substantially vertical orientation within housing 51 and is spaced away from the upwardly extending portion of partition 56 and sidewall 59. The upper extremity of baffle 57 is also spaced away from the lip portion 56' of partition 56 with a gravitational fall zone being substantially defined by partition 57 and sidewall 59. The lower boundary of fall zone 58 is defined by partition 60 which preferably is rigidly, or integrally, formed with sidewall 59 and extends in an upwardly inclining manner therefrom. Accordingly, a liquid accumulation space 60 is formed above partition 61 and a gas space above liquid space 60 is provided in communication with the upper reaches of gravitational fall zone 58 due to the spacing between the upwardly extending portion of partition 56 and baffle 57. In addition, the upper reaches of fall zone 58 are provided in communication with the gas space above liquid accumulation space 55.

A baffle 62 is disposed in a substantially vertical manner and is spaced away from the sidewall of housing 51 with the uppermost extremity of this baffle being spaced away from partition 61. Accordingly, a gravitational fall zone 63 is defined substantially between baffle 62 and the sidewall of housing 51. A liquid accumulation space 64 is formed in the lower reaches of housing 51 and a gas space above liquid accumulation space 64 is maintained in communication with the upper reaches of fall zone 63. A supply of gas to be dissolved in liquid flowing through device 50 is introduced into housing 51 through conduit 37. The pressure of the supplied gas is effective to depress liquid within the lower reaches of housing 51 thereby defining a liquid accumulation space 64 and a gas accumulation space thereabove. While the supply gas introduced into housing 51 may be obtained from a gas space within housing 35 of a sparging mixing device 36 supplied with a feed gas under suitable pressure from conduit 41, it will be realized that any suitable gas supply may be utilized to introduce gas into conduit 37.

The operation of the exemplary embodiment of apparatus for treating a liquid with a gas illustrated in FIG. 3 will now be described. Liquid in enclosure 20 which has been contacted with gas emitted from mixing device 22 is caused to flow beneath partition 26' into gravitational fall static mixing device 50. Liquid flows along the upper surface of partition 53 under the pressure head generated within enclosure 20 and is caused to undergo a gravitational fall at zone 52. The liquid flow, which is depicted by solid arrows, continues into liquid accumulation space 56 and subsequently undergoes a second gravitational fall through zone 58 upon passing over lip portion 56' of partition 56. Liquid is next accumulated in liquid accumulation space 60 and upon passing over an edge of partition 61, the liquid undergoes a third gravitational fall through zone 63. Again, liquid is subsequently accumulated in liquid accumulation space 64 and is then admitted into the final sparging stage of dissolution device 11. In order to direct liquid admitted into chamber 35 above mixing device 36 to assure the contacting of a feed gas emitted from device 36 with the liquid, an appropriately disposed baffle 65 is preferably provided. The effluent of this stage of dissolution device 11 is then admitted into reaction tank 12 in a manner similar to the operation of the apparatus illustrated in FIG. 1.

The gas for treating a liquid in accordance with the teachings of the present invention is preferably initially supplied through conduit 41 and by means of mixing device 36 such gas is caused to contact, and is dissolved in, the liquid within chamber 35. Gas disentrained from this liquid is collected in conduit 37 and is subsequently introduced into the lower reaches of static mixing device 50. It will be realized, however, that any suitable gas supply, such as an ozone enriched atmosphere, may be connected to conduit 37 provided that such gas is under a pressure sufficient to depress liquid within housing 51 to a predetermined level, such as the surface level of liquid accumulation space 64. The gas introduced into the gas space immediately above liquid accumulation space 64 is permitted to enter the upper reaches of fall zone 63 by passing between baffle 62 and partition 61 and is swept downwardly by the liquid fall. As a result of the high degree of liquid turbulence in fall zone 63, the gas is dissolved in and is entrained by liquid flowing therethrough. Gas which is disentrained from liquid accumulation space 64 is also available for return to the upper reaches of fall zone 63 and, further dissolution in liquid flowing therethrough. Gas passing between partition 61 and baffle 62 is effective to establish a gas space in the upper regions of fall zone 63 and above liquid accumulation space 60. Accordingly, the introduction of gas through conduit 37 into the space above liquid accumulation space 64 is effective to cause a gas flow, as indicated by broken arrows in FIG. 3, upwardly along the lower surface of partition 56 and between baffle 57 and the upwardly extending portion of baffle 56. Thus gas is provided in communication with the upper reaches of fall zone 58 and is consequently available for dissolution in a liquid flowing therethrough. In addition, the gas admitted to the upper regions of fall zone 58 is effective to establish a gas space in the upper reaches of fall zone 58 thereby depressing the liquid level above partition 56 so as to form a gas space above liquid accumulation space 55. In a manner similar to the foregoing, gas in the last mentioned gas space is supplied to the upper reaches of fall zone 52 and is available for dissolution in liquid flowing therethrough. Similarly, gas disentrained from liquid entering liquid accumulation space 60 and from liquid entering liquid accumulation space 55 is returned to the upper reaches of respective fall zones 58 and 52 and hence, is also available for dissolution in liquid flowing therethrough.

It will be noted that the liquid level in accumulation spaces 55 and 60 is determined by lip 56' and the left end or extremity of partition 61. In addition, gas recycled to a fall zone is available for dissolution in liquid flowing therethrough as well as passing in a net counterflow relation to the previous stage of mixing device 50.

The dissolution of gas in a liquid, such as the dissolution of ozone in wastewater flowing through fall zone 63 is effective to strip other gases from the wastewater. Accordingly, the content of the ozone to be dissolved in the wastewater is reduced as the ozone flows in a counterflow relation through each dissolution stage (fall zone) of static mixing device 50 to a previous stage. Thus, the ozone content of the ozonating gas decreases as the ozonating gas flows from fall zone 63, to zone 58 and subsequently to zone 52. Hence, the ozone content of the ozonating gas collected in conduit 39 and supplied to mixing device 22, is significantly lower than the ozone content of the ozone feed gas supplied to conduit 41. However, as the ozone demand of wastewater can be effectively satisfied by subjecting wastewater to multiple dissolution as heretofore described, the reduction in ozone content of ozonating gas is still satisfactory for the purpose of dissolving a predetermined amount of ozone in wastewater with minimal mechanical energy costs and a maximum utilization of a supplied ozone enriched feed gas.

It will be appreciated that dissolution device 11 and particularly, static mixing device 50 thereof may be utilized to dissolve other gases in various liquids. Thus, oxygen may be effectively dissolved in the "mixed liquor" in the secondary stage of an activated sludge waste treatment process. In addition, although a particular structural configuration of dissolution stages has been depicted in FIG. 3, other structural arrangements may be employed as well. Thus, for example, the gravitational fall zones 52, 58 and 63 may be provided in a pipe configuration, which is particularly advantageous where space is critically limited. In addition, the dissolution device 11 illustrated in FIGS. 1 and 3 may be readily affixed to a substantially larger reaction tank 12 at the inlet thereof.

It is also realized that in order to assure sufficient retention time in reaction tank 12 to permit the consumption of ozone by the water contained therein, the volume of tank 12 between individual stages thereof may be increased accordingly. Although such an increase in tank size will correspondingly increase the capital cost of apparatus 10, it will be appreciated that by recycling water as previously described, only a single reaction tank 12 and a single dissolution device 11 are required to satisfactorily dissolve ozone in wastewater.

It will be understood that should it be necessary to enhance the dissolution of ozone in wastewater, the reaction volume of device 11 may be increased by increasing the volume of the liquid accumulation space in each of the stages thereof depicted in FIG. 1.

In order to enable the aforedescribed system for ozonating wastewater to treat widely varying flow rates of wastewater, it may be desirable to provide a plurality of dissolution stages in parallel between the initial and final sparging stages. Suitable flow dividers and valving arrangements may be provided to enable wastewater to be selectively directed through one or more of the dissolution stages utilizing gravitational fall zones.

While the present invention has been particularly described in terms of specific embodiments thereof, it will be understood that numerous variations upon the invention are now enabled to those skilled in the art, which variations are yet within the scope of the instant teaching. Accordingly, the present invention is to be broadly construed and limited only by the scope and the spirit of the claims now appended hereto.

What is claimed is:

1. A method of treating a liquid exhibiting a demand for a gas comprising the steps of introducing said liquid into the initial stage of a multistage dissolution device, passing said liquid by gravity generally downwardly from one stage to the next through all stages of the device, introducing said gas into the final stage of the device to thereby establish a gas-liquid counterflow through said stages and to dissolve at least a portion of said gas in said liquid, subjecting said liquid to a confined gravitational free fall through said gas in a fall zone in at least one of said stages to create a high liquid-gas turbulence in said zone thereby effecting a mass transfer of at least a portion of said gas into said liquid, disentraining undissolved gas from said liquid after passage thereof through said zone, and passing said disentrained gas from said space generally upwardly to a previous stage of said device by the buoyancy of said gas; conducting the effluent of said device to a reaction tank wherein dissolved gas is consumed in said liquid; recycling at least a portion of the liquid in said reaction tank to the initial stage of the dissolution device to enable further dissolution of said gas in said liquid; and discharging treated liquid from said reaction tank.

2. A method as defined in claim 1 wherein said step of disentraining undissolved gas includes passing said liquid to a liquid accumulation space in said stage to enable a reduction in the velocity of said liquid exiting said zone and the disentrainment of undissolved gas from said liquid and collecting disentrained gas in a gas space overlying said liquid accumulation space.

3. A method as defined in claim 1 wherein said step of introducing said gas to establish a gas-liquid counterflow through said device includes collecting said gas in the upper reaches of each of said stages but the initial stage of said device after contacting said gas with said liquid therein and passing said collected gas by buoyancy to the preceding stage for further dissolution of said gas in said liquid.

4. A method as defined in claim 3 additionally comprising the step of collecting said gas in the upper reaches of the initial stage of said device and returning said collected gas to a source for producing said gas.

5. A method as defined in claim 1 wherein said step of contacting said gas with said liquid includes sparging said gas into said liquid in predetermined ones of said stages and subjecting said liquid to a gravitational fall through said gas in each of the remaining ones of said stages.

6. A method as defined in claim 5 wherein said gas is sparged into liquid in said first and final stages of said device and said liquid is subjected to said gravitational fall in said stages intermediate said initial and final stages of said dissolution device.

7. A method as defined in claim 1 wherein said step of recycling includes controlling the flow rate of liquid recycled from said reaction tank in relation to the flow rate and dissolved gas demand of liquid introduced into said dissolution device.

8. A method as defined in claim 1 additionally comprising the step of effecting a flotation clarification in the initial stage of said dissolution device thereby causing the coagulation of suspended solids and the flotation of said solids on the surface of liquid within said first stage of said dissolution device.

9. A method as defined in claim 8 wherein a sparger is disposed below the surface of liquid in the initial stage of said dissolution device and wherein the step of introducing said liquid includes admitting said liquid into said initial stage at a point above said sparger such that gas emitted from said sparger contacts introduced liquid prior to substantial dilution of such introduced liquid in liquid within said initial stage of said dissolution device.

10. A method as defined in claim 1 wherein said gas comprises an enriched ozone atmosphere and said liquid comprises wastewater to be ozonated.

11. Apparatus for treating a liquid exhibiting a demand for a gas comprising: multistage dissolution means having a plurality of serially arranged dissolution stages each of which is at a greater elevation than the following stage such that a liquid is conducted downwardly and serially therethrough; inlet means for introducing said liquid into the initial stage of said dissolution means; means for establishing a gas-liquid counterflow through all stages of said dissolution means thereby dissolving at least a portion of said gas in the liquid in each of said stages at least one of which stages comprises means for subjecting said liquid to a gravitational fall through said gas to produce a high liquid-gas turbulence whereby a mass transfer of a portion of said gas into said liquid is effected, means for disentraining undissolved gas from said liquid upon passage thereof through said fall means; and means for passing said disentrained gas to the preceding stage of said dissolution means; a reaction tank adapted to receive liquid from the last stage of said dissolution means such that said dissolved gas is substantially consumed by said liquid in said reaction tank; and means for recycling liquid in said reaction tank to said initial stage of said dissolution means to enable further dissolution of said gas in said liquid.

12. Apparatus as defined in claim 11 further comprising supply means for generating said gas and means for returning said gas disentrained from liquid in said initial stage of said dissolution means to said supply means.

13. Apparatus as defined in claim 12, wherein one or more of said stages of said dissolution means includes means for sparging said gas into said liquid in each of said stages.

14. Apparatus as defined in claim 12 wherein said dissolution means includes one or more stages intermediate said initial and final stages, each of said intermediate stages comprising a gravitational fall static mixing device and each of said initial and final stages comprising means for sparging said gas into said liquid.

15. Apparatus as defined in claim 12 wherein said means for producing said gas comprise ozone generator and said liquid comprises wastewater.

16. Apparatus as defined in claim 11 wherein said means for disentraining undissolved gas include liquid accumulation means for receiving said liquid from said fall means and for reducing the velocity of liquid leaving said fall to enable the disentrainment of undissolved gas and means for collecting said disentrained gas in a gas space overlying said liquid accumulation means.

17. Apparatus for dissolving a gas in a liquid comprising a plurality of substantially overlying dissolution stages arranged to define a generally downward liquid flow path therethrough, each of said stages having a gas accumulation space therein and at least one of said stages comprising a static gas-liquid mixing device having a gravitational fall zone wherein said liquid is subjected to a free fall through said gas thereby promoting a high liquid-gas turbulence in said zone and the dissolution of at least a portion of said gas in said liquid, liquid accumulation means adapted to receive liquid passing through said fall zone and gas entrained in said liquid, gas accumulation means overlying said liquid accumulation means and interconnection means for recycling gas from said gas accumulation means to said fall zone with the uppermost portion of each fall zone disposed in communication with the gas accumulation space in the immediate overlying dissolution stage; and means for introducing said gas under pressure into the lowermost one of said stages such that said gas flows in counterflow relationship to said generally downward liquid flow through successive ones of said dissolution stages.

18. Apparatus as defined in claim 17 additionally comprising enclosure means for receiving said liquid and adapted to pass said received liquid to said uppermost gravitational fall static mixing device; sparging means disposed in said enclosure means for contacting said liquid with said gas; and conduit means communicating between the upper reaches of the fall zone of said uppermost gravitational fall static mixing device and said sparging means for supplying said gas to said sparging means.

19. Apparatus as defined in claim 18 wherein the lowermost of said stages includes means for receiving effluent from said lowermost gravitational fall static mixing device; sparging means disposed in said receiving means for contacting received liquid with a feed gas; means for collecting said gas disentrained from said liquid within said receiving means; and means for supplying said disentrained gas collection in the gas accumulation space of said further dissolution stage to said lowermost gravitational fall static mixing device.

20. Apparatus as defined in claim 19 wherein the concentration of said gas, to be dissolved in said liquid, present in said feed gas is decreased as said gas is sequentially introduced into each of said dissolution stages in counterflow relationship to the flow of said liquid therethrough.

* * * * *